(12) United States Patent
Takayama et al.

(10) Patent No.: US 10,040,892 B2
(45) Date of Patent: Aug. 7, 2018

(54) POLYURETHANE ELASTIC YARN AND PRODUCTION METHOD THEREOF

(75) Inventors: Hiroshi Takayama, Shiga (JP); Toshihiro Tanaka, Shiga (JP); Masashi Hara, Shiga (JP); Hong Liu, Waynesboro, VA (US)

(73) Assignee: INVISTA North America S.a r.l., Wilmington, DE (US)

( * ) Notice: Subject to any disclaimer, the term of this patent is extended or adjusted under 35 U.S.C. 154(b) by 0 days.

(21) Appl. No.: 13/503,467

(22) PCT Filed: Oct. 26, 2010

(86) PCT No.: PCT/JP2010/006316
§ 371 (c)(1),
(2), (4) Date: Jun. 25, 2012

(87) PCT Pub. No.: WO2011/052185
PCT Pub. Date: May 5, 2011

(65) Prior Publication Data
US 2012/0259074 A1    Oct. 11, 2012

(30) Foreign Application Priority Data
Oct. 26, 2009 (JP) ................ 2009-245251

(51) Int. Cl.
| | |
|---|---|
| *C08G 18/32* | (2006.01) |
| *C08G 18/66* | (2006.01) |
| *C08G 18/48* | (2006.01) |
| *C08G 18/69* | (2006.01) |
| *C08G 18/76* | (2006.01) |
| *C08L 75/04* | (2006.01) |
| *D01F 6/70* | (2006.01) |
| *D01F 6/94* | (2006.01) |

(52) U.S. Cl.
CPC ..... *C08G 18/6674* (2013.01); *C08G 18/3206* (2013.01); *C08G 18/3228* (2013.01); *C08G 18/4854* (2013.01); *C08G 18/69* (2013.01); *C08G 18/698* (2013.01); *C08G 18/7671* (2013.01); *C08L 75/04* (2013.01); *D01F 6/70* (2013.01); *D01F 6/94* (2013.01)

(58) Field of Classification Search
CPC .................................. C08G 18/698
USPC ................................ 525/123, 131
See application file for complete search history.

(56) References Cited

U.S. PATENT DOCUMENTS

| | | | | |
|---|---|---|---|---|
| 5,273,558 A | * | 12/1993 | Nelson et al. ............ | 51/298 |
| 5,405,911 A | * | 4/1995 | Handlin et al. ............ | 525/139 |
| 7,601,793 B2 | * | 10/2009 | Suzuki et al. ............ | 528/75 |
| 2004/0171765 A1 | * | 9/2004 | Tsuji et al. ............ | 525/452 |
| 2010/0010171 A1 | * | 1/2010 | Ding et al. ............ | 525/92 C |
| 2010/0028568 A1 | * | 2/2010 | Weaver et al. ............ | 428/17 |
| 2010/0248575 A1 |   | 9/2010 | Malz | |

FOREIGN PATENT DOCUMENTS

| | | |
|---|---|---|
| CN | 101535538 A | 9/2009 |
| EP | 2092096 A2 | 8/2009 |
| JP | 08-269158 A | 10/1996 |
| JP | 2000086740 A | 3/2000 |
| JP | 2000-192329 A | 7/2000 |
| JP | 2002-88571 A | 3/2002 |
| JP | 2002-317332 A | 10/2002 |
| JP | 2005-75857 A | 3/2005 |
| JP | 2008-106188 A | 5/2008 |
| JP | 2008106188 A * | 5/2008 |
| JP | 2009-102566 A | 5/2009 |
| JP | 2010-509512 A | 3/2010 |
| JP | 2010-239520 A | 10/2010 |
| WO | 2005/080504 A1 | 9/2005 |
| WO | 2008/055860 A2 | 5/2008 |
| WO | 2009017868 A1 | 2/2009 |
| WO | 2009/054528 A1 | 4/2009 |
| WO | 2010/045155 A2 | 4/2010 |
| WO | 0102630 A1 | 1/2011 |
| WO | 2011/052185 A1 | 5/2011 |

OTHER PUBLICATIONS

Machine Translation of JP 2002-88571.*
Machine Translation of JP 2002-317332.*
Sartomer Product Bulletin. Hydroxyl Terminated Polybutadiene Resins and Derivatives—Poly bd® and Krasol®. Jun. 2007. Evidentiary reference.*
Machine Translation of JP 2008106188 A (Year: 2017).*
Patent Abstract for JP2010239520A.
Patent Abstract for JP2009-102566A.
Patent Abstract for JP2002-317332.
Patent Abstract for JP2002-088571.
Patent Abstract for JP2005-075857.
Patent Abstract of JP 2000-086740.
Extended European Search Report dated May 24, 2013.
International Search Report and Written Opinion Received for PCT Application No. PCT/JP2010/006316, dated Feb. 1, 2011, 6 pages.
International Preliminary Report and Patentability Report Received for PCT Patent Application No. PCT/JP2010/006316, dated May 10, 2012, 6 pages.

* cited by examiner

*Primary Examiner* — Michael M Dollinger
(74) *Attorney, Agent, or Firm* — Bridget C. Sciamanna; Kathleen A. Tyrrell

(57) ABSTRACT

[Problem] To provide a polyurethane elastic yarn which has the high strength and ductility sought in polyurethane elastic yarn, and also has excellent durability and heat resistance, as well as little fatigue at low temperature; and a production method thereof.
[Means of Resolution] A polyurethane elastic yarn made from polyurethane which has polymer diol and diisocyanate as starting substances, wherein said polyurethane comprises a polyurethane A containing a polybutadiene structure in which the proportion of 1,2-bonded butadiene structure to 1,4-bonded butadiene structure in the molecule is in the range from 91:9 to 20:80.

6 Claims, No Drawings

POLYURETHANE ELASTIC YARN AND PRODUCTION METHOD THEREOF

TECHNICAL FIELD

The present invention relates to a polyurethane elastic yarn having good low-temperature characteristics, high strength and ductility, high durability, good windability and the like, and a production method thereof.

BACKGROUND ART

Due to its excellent expansion and compression characteristics, elastic fiber is widely used in elastic fabric applications such as legwear, innerwear and sportswear, sanitary applications such as paper diapers and sanitary napkins, and industrial materials applications.

Among such elastic fibers, polyurethane elastic yarn which has high strength and ductility, high recoverability, high chemical resistance and high heat resistance has been sought. In order to expand the use of such polyurethane elastic yarn into new applications, techniques by bonding, rather than blending, a compound having various functions with polyurethane have been developed, to produce polyurethane elastic yarn which has the characteristics of both.

Conventional production techniques of such polyurethane elastic yarn in which compounds of various functions are bonded include, for example, a technique whereby functional polyurethane fiber is obtained, which, as its main chain, has polyurethane obtained by reacting diisocyanate and at least one type of diol having at least one double bond in the molecule, and, as a side chain, has a functional monomer having a vinyl group which was bonded to this main chain by graft polymerization (refer to patent document 1).

However, in the method disclosed in patent document 1, recoverability and heat resistance are insufficient, and in particular, when used in fabrics blended with polyester which require a weight reduction process, there are cases where use is limited because chemical resistance is insufficient, or because the permanent set is large at low temperatures. There are also cases where use is limited because the polyurethane elastic yarn itself is yellow in color.

In addition, a technique has also been proposed whereby polyurethane having excellent insulation characteristics and water resistance which can be used in electronic bridges is obtained by producing thermoplastic polyurethane using polybutadiene polyol containing at least 50 mol % 1,2-vinyl (patent document 2) groups. However, in the method disclosed in patent document 2, the obtained polyurethane is thermoplastic polyurethane, and as a result, it cannot be made into fibers by spinning and is not within the objective of the present invention.

PATENT DOCUMENTS

[Patent Document 1] Japanese Unexamined Patent Application Publication no. 2000-192329
[Patent Document 2] Japanese Unexamined Patent Application Publication no. 2008-106188

SUMMARY OF THE INVENTION

Problems to be Resolved by the Invention

The present invention provides an excellent polyurethane elastic yarn which has the high strength and ductility sought in polyurethane elastic yarn, and also has excellent durability and heat resistance, as well as little fatigue at low temperature, and a production method thereof.

Means for Resolving Problems

To resolve the aforementioned problems, the present invention employs any of the following means.

(1) A polyurethane elastic yarn made from polyurethane which has polymer diol and diisocyanate as starting substances, wherein said polyurethane comprises a polyurethane A containing a polybutadiene structure in which the proportion of 1,2-bonded butadiene structure to 1,4-bonded butadiene structure in the molecule is in the range from 91:9 to 20:80.

(2) A polyurethane elastic yarn made from polyurethane which has polymer diol and diisocyanate as starting substances, wherein said polyurethane comprises a polyurethane A containing a polyisoprene structure in which the proportion of 1,2-bonded isoprene structure to 1,4-bonded isoprene structure in the molecules is in the range from 91:9 to 20:80.

(3) The polyurethane elastic yarn according to the above item (1 or 2), wherein said polyurethane A is polyurethane made from a polydiene diol selected from the group consisting of polybutadiene diol, polyisoprene diol, and mixtures thereof, and diisocyanate.

(4) The polyurethane elastic yarn according to the above item (3), wherein said polyurethane A is polyurethane obtained by copolymerization of a polydiene diol selected from the group consisting of polybutadiene diol, polyisoprene diol, and mixtures thereof, a polymer diol other than said polybutadiene diol and diisocyanate.

(5) The polyurethane elastic yarn according to any of the above items (1) through (4), wherein said polyurethane is a mixture of said polyurethane A and a polyurethane B made from a polymer diol other than said polyene diol and diisocyanate.

(6) A method of producing a polyurethane elastic yarn by spinning a spinning starting solution containing polyurethane having polymer diol and diisocyanate as starting substances, wherein said polyurethane comprises a polyurethane A containing a polybutadiene structure in which the proportion of 1,2-bonded butadiene structure to 1,4-bonded butadiene structure in the molecule is in the range from 91:9 to 20:80.

(7) The method of producing a polyurethane elastic yarn according the above item (6), wherein the spinning method is dry spinning.

Effect of the Invention

Because the polyurethane elastic yarn according to the present invention comprises a polyurethane A containing a polydiene selected from the group consisting of a polybutadiene structure and a polyisoprene structure in which the proportion of 1,2-bonded butadiene or polyisoprene structure to 1,4-bonded butadiene or polyisoprene structure in the molecule is in the range from 91:9 to 20:80, it has the high strength and ductility sought in polyurethane elastic yarn, and also has excellent durability and heat resistance, as well as little fatigue at low temperature. As a result, clothing and the like that uses this elastic yarn has excellent desorption characteristics, fit, quality of appearance, feel and fade resistance, and the environment in which it is used is not limited.

EMBODIMENTS

The polyurethane elastic yarn in the present invention is an elastic yarn made from polyurethane which has polymer diol and diisocyanate as starting substances. Said polyurethane can be any that comprises a polyurethane containing a polybutadiene (or polyisoprene) structure in which the proportion of 1,2-bonded butadiene structure to 1,4-bonded butadiene structure in the molecule is in the range from 91:9 to 20:80. For example, that made from only polyurethane containing said polybutadiene structure, or that in which a polyurethane which differs from polyurethane containing said polybutadiene structure is blended, may be used without particular restriction. Also, the method of synthesis of these polyurethanes is not particularly restricted. Furthermore, below, the polyurethane containing the aforementioned polybutadiene structure is called "polyurethane A," and the polyurethane which differs from said polyurethane A is called "polyurethane B." The overall polyurethane which contains polyurethanes A and B is called simply "polyurethane."

A blend of polyurethane A and polyurethane B may be obtained by any of several methods. Examples include first providing a blend of the polymer diol including the specific polybutadiene or polyisoprene structure and a different polymer diol which are subsequently reacted with diisocyanate to provide a capped glycol which is subsequently chain extended to provide a polyurethane. Alternatively, the polymeric diol including the polybutadiene structure is reacted with diisocyanate to provide a capped glycol and the other polymeric diol is separately reacted with diisocyanate to provide a different capped glycol. The two separate capped glycols may be either separately chain extended to form polyurethane A and polyurethane B, respectively, or the capped glycols may be blended together and chain extended to form polyurethane.

Although polyurethane A is described herein as including polybutadiene, in any embodiment of the present invention, the polybutadiene structure can be replaced with a polyisoprene structure. Mixtures of polybutadiene diol and polyisoprene diol are also contemplated.

In the present invention, the polyurethane can be, for example, polyurethane urea made from polymer diol and diisocyanate and low-molecular-weight diamine, or polyurethane made from polymer diol and diisocyanate and low-molecular weight diol, provided that it comprises a polyurethane A containing a certain polybutadiene structure. Also, it can be polyurethane urea which uses a compound having a hydroxyl group and amino group in the molecule as a chain extender. Furthermore, it is preferred that a polyfunctional glycol or isocyanate or the like which is at least trifunctional is used, within a range which does not hamper the effect of the present invention.

Here, typical structural units which constitute the polyurethane in the present invention are described.

As the polymer diol of a structural unit which constitutes the polyurethane, polymer diol having a polybutadiene (or polyisoprene) structure in which the proportion of 1,2-bonded butadiene (or polyisoprene) structure to 1,4-bonded butadiene (or polyisoprene) structure is in the range from 91:9 to 20:80, such as polybutadiene (or polyisoprene) diol or hydrogenated polybutadiene (or polyisoprene) diol, can be used. In addition, it is preferred to also use polyether-based diol, polyester-based diol, polycarbonate diol and the like in combination with the above. It is particularly preferred to use polyether-based diol in combination, from the viewpoint of providing the yarn with pliability and ductility.

Compound 1 is given as an example of polybutadiene diol and polyisoprene diol, and compound 2 is given as an example of hydrogenated polybutadiene diol and hydrogenated polyisoprene diol.

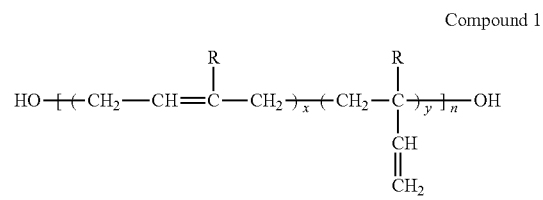

R = H Polybutadiene diol
R = CH3 Polyisoprene diol

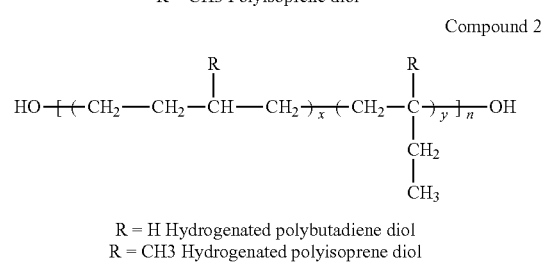

R = H Hydrogenated polybutadiene diol
R = CH3 Hydrogenated polyisoprene diol

Furthermore, although a block structure is shown in compound 1 and compound 2, it can also be a random structure.

Examples of polyether-based diol that can be used include those glycols with two or more hydroxy groups, from ring-opening polymerization and/or copolymerization of ethylene oxide, propylene oxide, trimethylene oxide, tetrahydrofuran, and 3-methyltetrahydrofuran, or from condensation polymerization of a polyhydric alcohol, such as a diol or diol mixtures, with less than 12 carbon atoms in each molecule, such as ethylene glycol, 1,3-propanediol, 1,4-butanediol, 1,5-pentanediol 1,6-hexanediol, 2,2-dimethyl-1,3 propanediol, 3-methyl-1,5-pentanediol, 1,7-heptanediol, 1,8-octanediol, 1,9-nonanediol, 1,10-decanediol and 1,12-dodecanediol.

Specific examples of the polyether-based diol compound include polyethylene glycol, modified polyethylene glycol, polypropylene glycol, polytrimethylene ether glycol, polytetramethylene ether glycol (abbreviated as PTMG hereinafter), modified PTMG which is a copolymer of tetrahydrofuran (abbreviated as THF hereinafter) and 3-methyl-THF, modified PTMG which is a copolymer of THF and 2,3-dimethyl-THF, modified PTMG which is a copolymer of THF and neopentyl glycol, random copolymers in which THF and ethylene oxide and/or propylene oxide are irregularly arranged, and the like. One of these polyether-based glycols may be used, or a mixture or copolymer of two or more may be used. Among these, PTMG or modified PTMG is preferred.

From the viewpoint of increasing abrasion resistance and light resistance in the polyurethane yarn, it is preferred to use a polyester-based glycol such as polyester diol having a side chain obtained by condensation polymerization of adipic acid or the like with a mixture of butylene adipate, polycaprolactone diol, 3-methyl-1,5-pentane diol and polypropylene polyol; or a polycarbonate diol containing dicarboxylic acid ester units derived from a diol component and a dicarboxylic acid component made from 3,8-dimethyldecane dioic acid and/or 3,7-dimethyldecane dioic acid; or the like.

Examples of polycarbonate-based diols that can be used include those carbonate glycols with two or more hydroxy groups, produced by condensation polymerization of phosgene, chloroformic acid ester, dialkyl carbonate or diallyl carbonate and aliphatic polyols, or their mixtures, of low molecular weights with no more than 12 carbon atoms in each molecule. Examples of suitable polyols for preparing the polycarbonate polyols are diethylene glycol, 1,3-propanediol, 1,4-butanediol, 1,5-pentanediol, 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polycarbonate polyol with a melting temperature of about 5° C. to about 50° C. is an example of a specific polycarbonate polyol.

As described above, one type of this polymer diol having a polybutadiene structure in which the proportion of 1,2-bonded butadiene structure to 1,4-bonded butadiene structure is in the range from 91:9 to 20:80, such as polybutadiene diol or hydrogenated polybutadiene diol, can be used alone, or two or more types containing a polymer diol having such a polybutadiene structure can be mixed or copolymerized. That is, a polyurethane A is synthesized from a polymer diol having a polybutadiene structure in which the proportion of 1,2-bonded butadiene structure to 1,4-bonded butadiene structure is in the range from 91:9 to 20:80 and diisocyanate, and this can be used, or, a polyurethane A is synthesized by copolymerizing a polymer diol having a polybutadiene structure in which the proportion of 1,2-bonded butadiene structure to 1,4-bonded butadiene structure is in the range from 91:9 to 20:80, a polymer diol other than said polymer diol and diisocyanate, and this can be used. Also, a polyurethane B is synthesized from a polymer diol other than the polymer diol having the aforementioned polybutadiene structure and diisocyanate, and said polyurethane B is mixed with polyurethane A, and this can be used.

The molecular weight of the polymer diol used in the present invention is preferably 1000 to 8000, more preferably 1500 to 6000, by number average molecular weight, in order to meet the desired levels of ductility, strength, heat resistance and the like when it is made into elastic yarn. By using a polymer diol with molecular weight in this range, elastic yarn having excellent ductility, strength, elastic recovery and heat resistance can be obtained.

As the diisocyanate of a structural unit which constitutes the polyurethane, aromatic diisocyanates such as diphenylmethane diisocyanate (abbreviated as MDI hereinafter), tolylene diisocyanate, 1,4-diisocyanate benzene, xylylene diisocyanate and 2,6-naphthalene diisocyanate are particularly suitable for synthesizing polyurethane of heat resistance and strength. In addition, preferred examples of alicyclic diisocyanates include methylenebis(cyclohexyl isocyanate), isophorone diisocyanate, methylcyclohexane 2,4-diisocyanate, methylcyclohexane 2,6-diisocyanate, cyclohexane 1,4-diisocyanate, hexahydroxylylene diisocyanate, hexahydro tolylene diisocyanate and octahydro 1,5-naphthalene diisocyanate. Aliphatic diisocyanates can be used effectively, particularly for inhibiting yellowing of the polyurethane yarn. One of these diisocyanates can be used alone, or two or more can be used in combination.

As the chain extender of a structural unit which constitutes the polyurethane, it is preferred to use at least one type selected from low-molecular-weight diamines and low-molecular-weight diols. Furthermore, it can have a hydroxyl group and amino group in the molecule, as in ethanolamine.

Preferred examples of low-molecular-weight diamines include ethylenediamine (abbreviated as EDA hereinafter), 1,2-propanediamine, 1,3-propanediamine, hexamethylenediamine, p-phenylenediamine, p-xylylenediamine, m-xylenediamine, p,p'-methylenedianiline, 1,3-cyclohexyldiamine, hexahydro metaphenylenediamine, 2-methylpentamethylenediamine and bis(4-aminophenyl) phosphine oxide. It is preferred to use one or two or more types among these. Ethylenediamine is particularly preferred. By using ethylenediamine, yarn having excellent ductility, elastic recovery, as well as heat resistance can be obtained. Triamine compounds that can form a bridge structure—for example, diethylenetriamine and the like—can be added to these chain extenders to a degree such that the effect of the present invention is not lost.

Typical low-molecular-weight diols include ethylene glycol (abbreviated as EG hereinafter), 1,3-propane diol, 1,4-butane diol, bishydroxyethoxybenzene, bishydroxyethyleneterephthalate, 1-methyl-1,2-ethane diol and the like. It is preferred to use one or two or more types among these. Ethylene glycol, 1,3-propane diol and 1,4-butane diol are particularly preferred. When these are used, high heat resistance of the diol-extended polyurethane is high, and yarn having high strength can be obtained.

In addition, it is preferred that one or two or more types of terminal blocking agent are mixed into the polyurethane in the present invention. Preferred examples of terminal blocking agents include monoamines such as dimethylamine, diisopropylamine, ethylmethylamine, diethylamine, methylpropylamine, isopropylmethylamine, diisopropylamine, butylmethylamine, isobutylmethylamine, isopentylmethylamine, dibutylamine and diamylamine, monools such as ethanol, propanol, butanol, isopropanol, allyl alcohol and cyclopentanol, and monoisocyanates such as phenyl isocyanate and the like.

It is preferred that the number average molecular weight of the polyurethane in the present invention is in the range of 40,000 to 150,000 from the viewpoint of obtaining fibers of high durability and strength. Here, molecular weight is the value in terms of polystyrene, measured by GPC.

It is particularly preferred that the polyurethane that constitutes the elastic yarn of the present invention is made from polymer diol and diisocyanate, and the high-temperature melting point is preferably in the range of 150° C. to 300° C., more preferably 200° C. to 260° C., from the viewpoint of obtaining excellent heat resistance and having no problems in practical use, including the ability to pass through the process steps. Here, the high-temperature melting point means the melting peak point of the so-called hard segment crystals of the polyurethane or polyurethane urea when measured by DSC.

That is, because its ductility is high, it has no problems in practical use, including the ability to pass through the process steps as described above, and its heat resistance is high, what is particularly preferred is elastic yarn produced from polyurethane having a high-temperature melting point in the range of 150° C. to 300° C., more preferably 200° C. to 260° C., wherein the polyurethane is synthesized using, as the polymer diols, PTMG and polymer diols of molecular weight in the range of 1000 to 8000, more preferably 1500 to 6000, having a polybutadiene structure in which the proportion of 1,2-bonded butadiene structure to 1,4-bonded butadiene structure is in the range from 91:9 to 20:80; and, as the diisocyanate, MDI; and, as the chain extender, at least one type selected from the group made up of ethylene glycol, 1,3-propane diol, 1,4-butane diol, ethylenediamine, 1,2-propanediamine and 1,3-propanediamine.

If a diol is used in the chain extender, the typical method of adjusting the high-temperature melting point of the polyurethane to within the range of 150° C. to 300° C., more preferably 200° C. to 260° C., is to control the types and the ratio of polymer diol, MDI and diol extender. If the molecular weight of the polymer diol is low, polyurethane having a high high-temperature melting point can be obtained by relatively increasing the proportion of MDI. Similarly, if the molecular weight of the polymer diol is low, polyurethane having a high high-temperature melting point can be obtained by relatively decreasing the proportion of polymer diol.

For example, if the molecular weight of the polymer diol is 1800 or above, in order for the high-temperature melting point to be 200° C. or above, it is preferred to perform polymerization with the proportion of moles of MDI/moles of polymer diol=1.5 or above.

The polyurethane elastic yarn of the present invention uses polyurethane having the basic structure described above which is characterized in that it comprises a polyurethane A containing a polybutadiene structure in which the proportion of 1,2-bonded butadiene structure to 1,4-bonded butadiene structure in the molecule is in the range from 91:9 to 20:80. The proportion of 1,2-bonded butadiene structure to 1,4-bonded butadiene structure in the polybutadiene structure is in the range from 91:9 to 20:80 from the viewpoint of obtaining strength and ductility, durability, low-temperature characteristics and windability, and the range from 70:30 to 40:60 is more preferred from the viewpoint of obtaining even better strength, ductility and durability.

The polyurethane elastic yarn of the present invention can contain various stabilizers, pigments and so forth. For example, it is preferred that the photostabilizers, antioxidants and so forth also contain hindered phenol-based agents such Sumilizer GA-80 made by Sumitomo Chemical Co. Ltd. or BHT; benzophenone-based or benzotriazole-based agents such as Tinuvin varieties made by Ciba-Geigy Ltd.; phosphorus-based agents such as Sumilizer P-16 made by Sumitomo Chemical Co. Ltd.; various hindered amine-based agents; various pigments such as iron oxide and titanium oxide; inorganic substances such as zinc oxide, cerium oxide, magnesium oxide, calcium carbonate and carbon black; metal soaps such as fluorine-based or silicone-based resin powder and magnesium stearate; bactericidal agents containing silver or zinc or compounds thereof; deodorizing agents; lubricants such as silicone and mineral oil; and various antistatic agents such as barium sulfate, cerium oxide, betaine and phosphates. Also, it is preferred that these are able to be reacted with the polymer. To further improve durability against light and various nitrogen oxides and the like in particular, it is preferred to use, for example, nitrogen oxide promoters such as HN-150 made by Nippon Hydrazine Co., Ltd., thermal oxidation stabilizers such as Sumilizer GA-80 made by Sumitomo Chemical Co. Ltd., and photostabilizers such as Sumisorb 300 #622 made by Sumitomo Chemical Co. Ltd. Also, to further improve durability against light and various nitrogen oxides and the like in particular, it is preferred to use a nitrogen oxide promoter.

Also, from the viewpoint of improving heat resistance and functionality, inorganic substances or inorganic porous substances (for example, bamboo charcoal, charcoal, carbon black, porous mud, clay, diatomaceous earth, coconut-shell activated carbon, coal-based activated carbon, zeolite, pearlite and the like) can be added within a range that does not hamper the effect of the present invention.

Next, the production method of polyurethane elastic yarn of the present invention is explained in detail.

In the present invention, using the above-described polymer diol and diisocyanate as starting substances, polyurethane A containing a polybutadiene structure in which the proportion of 1,2-bonded butadiene structure to 1,4-bonded butadiene structure in the molecule is in the range from 91:9 to 20:80 is polymerized, and a spinning starting solution containing the aforementioned polyurethane A is prepared and spun.

The method of producing the polyurethane and the polyurethane solution (spinning starting solution) which contains it can be either melt polymerization or solution polymerization, or another method can be used. For example, the polyurethane and the spinning starting solution which contains it can be obtained by synthesis in a solvent such as DMAc, DMF, DMSO, NMP and the like or a solvent having these as the main ingredient, using the aforementioned starting materials. To do this, the so-called one-shot method can be used, wherein each starting material is put into the solvent and dissolved, then reacted while heating at an appropriate temperature, and a polyurethane solution is thereby obtained. Another method which can be suitably employed is one wherein the polymer diol and diisocyanate are first melt-reacted, immediately after which the reactant is dissolved in a solvent, and this is reacted with the aforementioned diol, and a polyurethane solution is thereby obtained. However, solution polymerization is more preferred. When solution polymerization is used, it is easy to obtain polyurethane elastic yarn which generates little foreign substance such as gel in the polyurethane, which is easy to spin, and which has low fineness. Of course if solution polymerization is used, there is the advantage that there are fewer operations to make a solution.

When synthesizing such a polyurethane, it is preferred to use one or a mixture of two or more types of catalyst, such as amine-based catalysts or organometallic catalysts.

Examples of amine-based catalysts include N,N-dimethylcyclohexylamine, N,N-dimethylbenzylamine, triethylamine, N-methylmorpholine, N-ethylmorpholine, N,N,N',N'-tetramethylethylenediamine, N,N,N',N'-tetramethyl-1,3-propanediamine, N,N,N',N'-tetramethylhexanediamine, bis-2-dimethylaminoethylether, N,N,N',N',N'-pentamethyldiethylenetriamine, tetramethylguanidine, triethylenediamine, N,N'-dimethylpiperazine, N-methyl-N'-dimethylaminoethylpiperazine, N-(2-dimethylaminoethyl) morpholine, 1-methylimidazole, 1,2-dimethylimidazole, N,N-dimethylaminoethanol, N,N,N'-trimethylaminoethylethanolamine, N-methyl-N'-(2-hydroxyethyl)piperazine, 2,4,6-tris(dimethylaminomethyl)phenol, N,N-dimethylaminohexanol, triethanolamine and the like.

Examples of organometallic catalysts include tin octanoate, dibutyltin dilaurylate, dibutyllead octanoate and the like.

Furthermore, in preparing a spinning starting solution which contains both polyurethane A having the above-described polybutadiene structure and polyurethane B which does not have said polybutadiene structure, it is preferred that two polyurethane solutions, in which polyurethane A and polyurethane B, respectively, are uniformly dispersed in the same type of solvent, are prepared in advance, and they are mixed and stirred before spinning.

A bicomponent spandex which includes polyurethane A in one component such as a sheath and polyurethane B in a different component such as a core is also contemplated. Methods for preparing bicomponent spandex are disclosed in PCT publication WO2010/045155. Polyurethane A and polyurethane B may also be blended in one or both components in different ratios.

Bicomponent fibers have been typically prepared by a melt-spinning process. The apparatuses used for these processes can be adapted for use with a solution-spinning process. Dry-spinning and wet-spinning are solution-spinning processes that are well-known.

Extrusion of the polymer through a die to form a bicomponent fiber is done with conventional equipment such as, for example, extruders, gear pumps and the like. It is preferred to employ separate gear pumps to supply the polymer solutions to the die. When blending additives for functionality, the polymer blend is preferably mixed in a static mixer, for example, upstream of the gear pump in order to obtain a more uniform dispersion of the components. Preparatory to extrusion each spandex solution can be separately heated by a jacketed vessel with controlled temperature and filtered to improve spinning yield.

The bicomponent spandex fibers may also be prepared by separate capillaries to form separate filaments which are subsequently coalesced to form a single fiber.

Process of Making Bicomponent Fibers

The bicomponent fiber of some embodiments is produced by solution spinning (either wet-spinning or dry spinning) of the polyurethane or polyurethane-urea polymer from a solution with conventional urethane polymer solvents (e.g., DMAc).

In one embodiment of preparing bicomponent fibers, the polymer solutions containing 30-40% polymer solids are metered through desired arrangement of distribution plates and orifices to form filaments. Distribution plates are arranged to combine polymer streams in a one of concentric sheath-core, eccentric sheath-core, and side-by-side arrangement followed by extrusion thru a common capillary. Extruded filaments are dried by introduction of hot, inert gas at 300° C.-400° C. and a gas:polymer mass ratio of at least 10:1 and drawn at a speed of at least 400 meters per minute (preferably at least 600 m/min) and then wound up at a speed of at least 500 meters per minute (preferably at least 750 m/min). All examples given below were made with 80° C. extrusion temperature in to a hot inert gas atmosphere at a take-up speed of 762 m/min. Standard process conditions are well-known in the art.

It is preferred that the polyurethane solution contains the above-described additives such as pigments and chemical agents such as photostabilizers and antioxidants as necessary. The additives can be put in the polyurethane in advance, but it is preferred that they are uniformly dispersed in the same type of solvent as the polyurethane, then this solution is mixed and stirred into the polyurethane solution. The contained amounts of additives are appropriately determined according to purpose.

The preferred concentration of polyurethane in the polyurethane solution (spinning starting solution) obtained in this way is normally in the range of 30 wt % to 80 wt %. Also, the preferred contained amount of polymer diol having a polybutadiene structure in which the proportion of 1,2-bonded butadiene structure to 1,4-bonded butadiene structure is in the range from 91:9 to 20:80 is at least 0.1 wt % with respect to the total weight of starting substance excluding solvent, and it is more preferably at least 5 wt % from the viewpoint of obtaining good spinnability, heat resistance and a good balance of mechanical properties. It is preferred that these contained quantities are tested in advance and appropriately determined depending on the application.

If the polyurethane containing the above-described polybutadiene structure is not dissolved in a solvent such as N,N-dimethylformamide, N,N-dimethylacetoamide or the like, it can also be dispersed in the spinning starting solution as microparticles of average diameter 10 microns or less.

Any method can be employed in the process or stirring and mixing in order to homogeneously disperse or dissolve the polyurethane solution and additives. Typical methods include methods using a static mixer, methods by stirring, methods using a homomixer, methods using a biaxial extruder and the like.

The polyurethane yarn of the present invention can be obtained by, for example, dry spinning, wet spinning or melt spinning the spinning starting solution constituted as above, then winding. Among these methods, dry spinning is preferred from the viewpoint that spinning can be stably performed at any fineness from thin to thick.

The fineness and cross-sectional shape of the polyurethane elastic yarn of the present invention are not particularly restricted. For example, the cross-sectional shape of the yarn can be round or flat, regular or irregular.

The dry spinning method is also not particularly restricted. Spinning conditions and the like can be appropriately selected in view of the desired characteristics and spinning equipment.

For example, because the permanent strain rate and stress relaxation of the polyurethane elastic yarn of the present invention are easily affected by the speed ratio of the godet roller and winder, it is preferred that this speed ratio is appropriately set according to the purpose of use of the yarn.

That is, from the viewpoint of obtaining polyurethane yarn which has the desired permanent strain rate and stress relaxation, it is preferred that winding is performed with a speed ratio of the godet roller and winder in the range of 1.10 to 1.65. Further, to obtain polyurethane yarn which has a particularly low permanent strain rate and low stress relaxation, the speed ratio of the godet roller and winder is preferably in the range of 1.15 to 1.4, more preferably 1.15 to 1.35. On the other hand, to obtain polyurethane yarn which has a particularly low permanent strain rate and low stress relaxation, the speed ratio of the godet roller and winder is preferably in the range of 1.25 to 1.65, more preferably 1.35 to 1.65.

In addition, by increasing the spinning speed, it is possible to improve the strength of the polyurethane elastic yarn. Therefore, it is preferred that a spinning speed of at least 450 m/minute is used in order to meet strength levels suitable for practical use. Further, taking industrial production into consideration, about 450 to 1000 m/minute is preferred.

EXAMPLES

The present invention is explained in further detail by means of examples. First, the evaluation methods of the various characteristics in the present invention are explained.

Analysis Method of Polymer Diol Having a Polybutadiene Structure in which the Proportion of 1,2-Bonded Butadiene Structure to 1,4-Bonded Butadiene Structure in the Yarn is in the Range from 91:9 to 20:80

The polyurethane elastic yarn was measured by an IR meter. The contained amounts in the yarn were determined from absorption near 907 $cm^{-1}$, by a calibration curve using polyurethane containing a known concentration of polybutadiene diol.

Permanent Set, Stress Relaxation, Fracture Strength, Fracture Ductility

The permanent set, stress relaxation, fracture strength and fracture ductility of the polyurethane elastic yarn were measured using an Instron model 4502 tensile testing machine. The number of measurements was n=3, and the average of these was used. Stress relaxation, fracture strength and fracture ductility were measured at 22° C., while permanent set was measured at both 22° C. and −5° C.

These are defined as follows.

A sample 5 cm long (L1) was stretched 300% at a pulling speed of 50 cm/minute five times repeatedly, and the stress when stretched 300% for the fifth time was taken as G1. Then, the length of the sample was held for 30 seconds in the 300% stretched state. The stress after being held for 30 seconds was taken as G2. Then, the length of the sample when the sample length was allowed to recover and stress returned to 0 was taken as L2. In addition, the sixth time, the sample was stretched until fracture. The stress at fracture was taken as G3, and the sample length at fracture was taken as L3. The aforementioned characteristics are calculated by the equations below.

Fracture strength (cN)=G3
Stress relaxation (%)=100×(G1−G2)/G1
Permanent set (%)=100×(L2−L1)/L1
Fracture ductility (%)=100×(L3−L1)/L1

Chemical Resistance

The yarn was affixed in the 100% stretched state, and the following three exposure treatments were performed. First, the yarn was immersed for 1 hour in a hexane solution of oleic acid (5 wt %), then it was immersed for 2 hours in hypochlorous acid solution (chlorine concentration 500 ppm), and then it was exposed to UV for 2 hours. The UV exposure treatment was performed at 63° C., 60% relative humidity using a carbon arc fadometer made by Suga Test Instruments Co., Ltd. After this exposure treatment was performed a total of two times, the yarn was left free for 24 hours at room temperature, and fracture strength (G4) was measured by the same method as above. The proportion of fracture strength after treatment (G4) with respect to fracture strength of the untreated yarn (G3) was taken as the chemical resistance. The number of measurements was n=3, and the average of these was used.

Chemical resistance (%)=100×G4/G3

Alkali Resistance

Treatment which is expected in a weight reduction process of polyester fiber was performed, and the fracture strength retention rate of the yarn was evaluated as an index of the alkali resistance of the polyurethane yarn.

The yarn was affixed in the 100% stretched state, and it was sealed in a pressure vessel, which was then filled with an aqueous solution containing 8.0 wt % each of a cation-based weight reduction promoter (DXN-10 made by Ipposha) and sodium hydroxide. After being treated for 120 minutes at 100° C., the yarn was left free for 24 hours at room temperature, and fracture strength (G5) was measured by the same method as above. The proportion of fracture strength after treatment (G5) with respect to fracture strength of the untreated yarn (G3) was taken as the alkali resistance. The number of measurements was n=3, and the average of these was used.

Alkali resistance (%)=100×G5/G3

Heat Softening Point

Heat softening point was measured as an index of heat resistance of the polyurethane yarn. The temperature distribution of dynamic storage modulus E' of the polyurethane yarn was measured at a heating rate of 10° C./minute, using a dynamic storage modulus measurement machine model RSA II made by Rheometrics. The heat softening point was determined from the intersection between the tangent of the E' curve in the region between 80° C. and 130° C. and the tangent of the E' curve produced when E' was reduced by softening at 160° C. and above. Furthermore, E' was on a logarithmic axis, and temperature was on a linear axis. The number of measurements was n=3, and the average of these was used.

Melting Point

High-temperature melting point—that is, the melting point of the hard segment crystals—was measured as an index of heat resistance of the polyurethane yarn. The irreversible heat flow of the polyurethane yarn was measured at a heating rate of 3° C./minute using a model 2920 modulated DSC made by TA Instruments, and its peak was taken as the melting point. The number of measurements was n=3, and the average of these was used.

Quality of Appearance of Dyed Stretch Fabric

Dyed stretch fabric was left still on a flat work surface so that wrinkles could be seen. It was observed visually, and evaluated at the following three levels.

○: No slackening, crimping or broken yarns, and no problems at all in actual use
Δ: Usable, but there is partial slackening
x: There are slackening, crimping and broken yarns, and it is unusable Example 1

A DMAc solution of 35 wt % polyurethane polymer (a1) made from PTMG of molecular weight 2900, MDI and ethylene glycol was polymerized by ordinary methods, thereby making polymer solution A1. Then, for a polyurethane containing a polybutadiene structure in which the proportion of 1,2-bonded butadiene structure to 1,4-bonded butadiene structure was 65:35, a DMAc solution of 35 wt % polyurethane polymer (b1) made from LBH 2000 made by Idemitsu Kosan Co., Ltd. having the structure shown in compound 1, MDI and ethylene glycol was polymerized, thereby making polymer solution B1. As an antioxidant, a polyurethane solution produced by the reaction of t-butyldiethanolamine and methylene-bis(4-cyclohexylisocyanate) (Methacrol™ 2462 made by DuPont (c1)) and a condensation polymer of p-cresol and divinylbenzene (Methacrol™ 2390 made by DuPont (c2)) were mixed in a weight ratio of 2 to 1, and a DMAc solution of the antioxidant (concentration 35 wt %) was prepared, and this was used as other additive solution C1 (35 wt %).

Then, 92 wt % of the polymer solution A1, 5 wt % of the polymer solution B1 and 3 wt % of the other additive solution C1 were uniformly mixed, thereby making spinning solution D1. This spinning solution was dry-spun and wound at a spinning speed of 540 m/minute and a speed ratio of the godet roller and winder of 1.4, thereby producing 20 dtex/monofilament polyurethane elastic yarn (200 g spool).

The composition (wt %) of the obtained polyurethane elastic yarn was as shown in Table 1.

The fracture ductility, fracture strength, permanent strain rate, stress relaxation, chemical resistance, alkali resistance, heat softening point and melting point of this polyurethane elastic yarn are shown in Table 2. Fracture ductility and strength were both greater than those in comparative example 1 (described below). Relaxation stress and permanent strain rate at 22° C. were lower than in comparative example 1, and permanent strain rate at −5° C. was reduced to about ¼ of that in comparative example 1, indicating that recoverability improved. Chemical resistance and alkali resistance were at least twice those in comparative example 1. Heat softening point and melting point, which are indices of heat resistance, both improved over comparative example 1.

Additionally, a stretch weave was created by the following method, and the quality of its appearance was evaluated.

First, a covering process was performed on the obtained polyurethane elastic yarn. Using regular 168 dtex/48-filament polyester fiber as the covering yarn, it was processed with 450 twists per meter and a draft of 3.0 using a covering machine, thereby making a covering yarn for the woof yarn. Similarly, using regular 168 dtex/48-filament polyester fiber as the covering yarn, it was processed with 700 twists per meter and a draft of 3.5 using a covering machine, thereby making a covering yarn for the warp yarn.

Next, warping and weaving were performed. To do this, 5100 warp yarns (rough winding warp 1100 yarns) were starched and warped, and they were woven with a 2/1 twill form using a rapier weaver.

After that, a dying process was performed. The product obtained by weaving was put through the following processes by ordinary methods, in this order: scouring, intermediate setting (185° C.), alkali weigh reduction (N treatment), embossing (190° C.), dying (130° C.), drying, finishing agent treatment and finishing setting (180° C., fabric speed 20 m/minute, set zone 24 m).

The obtained stretch weave had an excellent quality of appearance without flaws.

Example 2

For a polyurethane containing a polybutadiene structure in which the proportion of 1,2-bonded butadiene structure to 1,4-bonded butadiene structure was 65:35, a DMAc solution of 35 wt % polyurethane urea polymer (b2) made from LBH 3000 made by Idemitsu Kosan Co., Ltd., MDI and ethylenediamine was polymerized by ordinary methods, thereby making polymer solution B2. Then, 77 wt % of the polymer solution A1 prepared in example 1, 20 wt % of the polymer solution B2 prepared here and 3 wt % of the other additive solution C1 prepared in example 1 were uniformly mixed, thereby making spinning solution D2.

This spinning solution D2 was dry-spun and wound at a spinning speed of 540 m/minute and a speed ratio of the godet roller and winder of 1.40, thereby producing 20 dtex/monofilament polyurethane elastic yarn (200 g spool).

The composition (wt %) of the obtained polyurethane elastic yarn was as shown in Table 1.

The fracture ductility, fracture strength, permanent strain rate, stress relaxation, chemical resistance, alkali resistance, heat softening point and melting point of this polyurethane elastic yarn are shown in Table 2. Fracture ductility and breaking fracture strength were both greater than those in comparative example 1 (described below). Relaxation stress and permanent strain rate at 22° C. were lower than in comparative example 1, and permanent strain rate at −5° C. was reduced to less than ⅕ of that in comparative example 1, indicating that recoverability improved. Chemical resistance and alkali resistance were at least twice those in comparative example 1. Heat softening point and melting point, which are indices of heat resistance, both improved over comparative example 1.

Also, a stretch weave was produced by the same method as in example 1, and when quality of appearance was evaluated, the obtained stretch weave had an excellent quality of appearance without flaws.

Example 3

A DMAc solution of 35 wt % polyurethane urea polymer (a2) made from PTMG of molecular weight 1800, MDI, ethylenediamine and diethylamine as a terminal blocking agent was polymerized by ordinary methods, thereby making polymer solution A2. Then, 87 wt % of this polymer solution A2, 10 wt % of the polymer solution B2 prepared in example 2 and 3 wt % of the other additive solution C1 prepared in example 1 were uniformly mixed, thereby making spinning solution D3.

This spinning solution D3 was dry-spun and wound at a spinning speed of 600 m/minute and a speed ratio of the godet roller and winder of 1.20, thereby producing 20 dtex/2-filament multifilament polyurethane elastic yarn (500 g spool).

The composition (wt %) of the obtained polyurethane elastic yarn was as shown in Table 1.

The fracture ductility, fracture strength, permanent set, stress relaxation, chemical resistance, alkali resistance, heat softening point and melting point of this polyurethane elastic yarn are shown in Table 2. Fracture ductility and fracture strength were both greater than those in comparative example 2 (described below). Relaxation stress and permanent set at 22° C. were lower than in comparative example 2, and permanent strain rate at −5° C. was reduced to less than ¼ of that in comparative example 1, indicating that recoverability improved. Chemical resistance and alkali resistance were 2 times and 3 times, respectively, those in comparative example 2. Heat softening point and melting point, which are indices of heat resistance, both improved over comparative example 2.

Also, a stretch weave was produced by the same method as in example 1, and when quality of appearance was evaluated, the obtained stretch weave had an excellent quality of appearance without flaws.

Example 4

67 wt % of the polymer solution A2 prepared in example 3, 30 wt % of the polymer solution B1 prepared in example 1 and 3 wt % of the other additive solution C1 prepared in example 1 were uniformly mixed, thereby making spinning solution D4.

This spinning solution D4 was dry-spun and wound at a spinning speed of 600 m/minute and a speed ratio of the godet roller and winder of 1.30, thereby producing 20 dtex/2-filament multifilament polyurethane elastic yarn (500 g spool).

The composition (wt %) of the obtained polyurethane elastic yarn was as shown in Table 1.

The fracture ductility, fracture strength, permanent set, stress relaxation, heat softening point, melting point and chemical resistance of this polyurethane elastic yarn are shown in Table 2. Fracture ductility and fracture strength were both greater than those in comparative example 2 (described below). Relaxation stress and permanent set at 22° C. were lower than in comparative example 2, and permanent set at −5° C. was reduced to less than ¼ of that in comparative example 2, indicating that recoverability improved. Chemical resistance and alkali resistance were 2.5 or more times and 3 times, respectively, those in comparative example 2. Heat softening point and melting point, which are indices of heat resistance, both improved over comparative example 2.

Also, a stretch weave was produced by the same method as in example 1, and when quality of appearance was evaluated, the obtained stretch weave had an excellent quality of appearance without flaws.

Example 5

97 wt % of the polymer solution B1 prepared in example 1 and 3 wt % of the other additive solution C1 prepared in example 1 were uniformly mixed, thereby making spinning solution D5.

This spinning solution D5 was dry-spun and wound at a spinning speed of 540 m/minute and a speed ratio of the godet roller and winder of 1.40, thereby producing 20 dtex/monofilament polyurethane elastic yarn (200 g spool).

The composition (wt %) of the obtained polyurethane elastic yarn was as shown in Table 1.

The fracture ductility, fracture strength, permanent set, stress relaxation, chemical resistance, alkali resistance, heat softening point and melting point of this polyurethane elastic yarn are shown in Table 2. Fracture ductility and fracture strength were both greater than those in comparative example 1 (described below). Relaxation stress and permanent set at 22° C. were lower than in comparative example 1, and permanent set at −5° C. was reduced to less than ⅓ of that in comparative example 1, indicating that recoverability improved. Chemical resistance and alkali resistance were 2 or more times and 2.5 or more times, respectively, those in comparative example 1. Heat softening point and melting point, which are indices of heat resistance, both improved over comparative example 1.

Also, a stretch weave was produced by the same method as in example 1, and when quality of appearance was evaluated, the obtained stretch weave had an excellent quality of appearance without flaws.

Example 6

97 wt % of the polymer solution B2 prepared in example 2 and 3 wt % of the other additive solution C1 prepared in example 1 were uniformly mixed, thereby making spinning solution D6.

This spinning solution D6 was dry-spun and wound at a spinning speed of 600 m/minute and a speed ratio of the godet roller and winder of 1.30, thereby producing 20 dtex/2-filament multifilament polyurethane elastic yarn (500 g spool).

The composition (wt %) of the obtained polyurethane elastic yarn was as shown in Table 1.

The fracture ductility, fracture strength, permanent set, stress relaxation, heat softening point, melting point and chemical resistance of this polyurethane elastic yarn are shown in Table 2. Fracture ductility and fracture strength were both greater than those in comparative example 2 (described below). Relaxation stress and permanent set at 22° C. were lower than in comparative example 2, and permanent set at −5° C. was reduced to less than ⅙ of that in comparative example 2, indicating that recoverability improved. Chemical resistance and alkali resistance were 2.5 or more times and 3 or more times, respectively, those in comparative example 2. Heat softening point and melting point, which are indices of heat resistance, both improved over comparative example 2.

Also, a stretch weave was produced by the same method as in example 1, and when quality of appearance was evaluated, the obtained stretch weave had an excellent quality of appearance without flaws.

Example 7

For a polyurethane containing a polybutadiene structure in which the proportion of 1,2-bonded butadiene structure to 1,4-bonded butadiene structure was 90:10, a DMAc solution of 35 wt % polyurethane polymer (b3) made from G-2000 made by Nippon Soda Co., Ltd. having the structure shown in compound 1, MDI and ethylene glycol was polymerized by ordinary methods, thereby making polymer solution B3. Then, 92 wt % of the polymer solution A1 prepared in example 1, 5 wt % of the polymer solution B3 prepared here and 3 wt % of the other additive solution C1 prepared in example 1 were uniformly mixed, thereby making spinning solution D7.

This spinning solution D7 was dry-spun and wound at a spinning speed of 600 m/minute and a speed ratio of the godet roller and winder of 1.30, thereby producing 20 dtex/2-filament multifilament polyurethane elastic yarn (500 g spool).

The composition (wt %) of the obtained polyurethane elastic yarn was as shown in Table 1.

The fracture ductility, fracture strength, permanent set, stress relaxation, heat softening point, melting point and chemical resistance of this polyurethane elastic yarn are shown in Table 2. Fracture ductility and fracture strength were both greater than those in comparative example 1 (described below). Relaxation stress and permanent set at 22° C. were lower than in comparative example 1, and permanent set at −5° C. was reduced to less than ½ of that in comparative example 1, indicating that recoverability improved. Chemical resistance and alkali resistance were each 1.5 or more times those in comparative example 1. Heat softening point, which is an index of heat resistance, was the same as in comparative example 1, and melting point improved over comparative example 1.

Also, a stretch weave was produced by the same method as in example 1, and when quality of appearance was evaluated, the obtained stretch weave had an excellent quality of appearance without flaws.

Example 8

For a polyurethane containing a polybutadiene structure in which the proportion of 1,2-bonded butadiene structure to 1,4-bonded butadiene structure was 20:80, a DMAc solution of 35 wt % polyurethane urea polymer (b4) made from R-45HT made by Idemitsu Kosan Co., Ltd. having the structure shown in compound 1, MDI and ethylenediamine was polymerized by ordinary methods, thereby making polymer solution B4. Then, 87 wt % of the polymer solution A2 prepared in example 3, 10 wt % of the polymer solution B4 prepared here and 3 wt % of the other additive solution C1 prepared in example 1 were uniformly mixed, thereby making spinning solution D8.

This spinning solution D8 was dry-spun and wound at a spinning speed of 600 m/minute and a speed ratio of the godet roller and winder of 1.30, thereby producing 20 dtex/2-filament multifilament polyurethane elastic yarn (500 g spool).

The composition (wt %) of the obtained polyurethane elastic yarn was as shown in Table 1.

The fracture ductility, fracture strength, permanent set, stress relaxation, heat softening point, melting point and chemical resistance of this polyurethane elastic yarn are shown in Table 2. Fracture ductility and fracture strength were both greater than those in comparative example 2 (described below). Relaxation stress and permanent set at 22° C. were lower than in comparative example 2, and permanent set at −5° C. was reduced to less than ½ of that in comparative example 2, indicating that recoverability improved. Chemical resistance and alkali resistance were each 2 or more times those in comparative example 2. Heat softening point and melting point, which are indices of heat resistance, both improved over comparative example 2.

Also, a stretch weave was produced by the same method as in example 1, and when quality of appearance was evaluated, the obtained stretch weave had an excellent quality of appearance without flaws.

Example 9

For a polyurethane containing a polybutadiene structure in which the proportion of 1,2-bonded butadiene structure to 1,4-bonded butadiene structure was 65:35, PTMG of molecular weight 1800 and LBH 3000 made by Idemitsu Kosan Co. were mixed in a mole ratio of 1:1, and this was used as polymer diol B. Then, a DMAc solution of 35 wt % of polyurethane polymer (b5) made from polymer diol B, MDI and ethylene diglycol was polymerized by ordinary methods, thereby making polymer solution B5. Then, 97 wt % of this polymer solution B5 and 3 wt % of the other additive solution C1 prepared in example 1 were uniformly mixed, thereby making spinning solution D9.

This spinning solution D9 was dry-spun and wound at a spinning speed of 600 m/minute and a speed ratio of the godet roller and winder of 1.20, thereby producing 20 dtex/2-filament multifilament polyurethane elastic yarn (500 g spool).

The composition (wt %) of the obtained polyurethane elastic yarn was as shown in Table 1.

The fracture ductility, fracture strength, permanent set, stress relaxation, chemical resistance, alkali resistance, heat softening point and melting point of this polyurethane elastic yarn are shown in Table 2. Fracture ductility and fracture strength were both greater than those in comparative example 1 (described below). Relaxation stress and permanent set at 22° C. were lower than in comparative example 1, and permanent set at −5° C. was reduced to less than ¼ of that in comparative example 1, indicating that recoverability improved. Chemical resistance and alkali resistance were each 2 or more times those in comparative example 1. Heat softening point and melting point, which are indices of heat resistance, both improved over comparative example 1.

Also, a stretch weave was produced by the same method as in example 1, and when quality of appearance was evaluated, the obtained stretch weave had an excellent quality of appearance without flaws.

Example 10

For a polyurethane containing a polybutadiene structure in which the proportion of 1,2-bonded butadiene structure to 1,4-bonded butadiene structure was 65:35, a DMAc solution of 35 wt % of polyurethane urea polymer (b6) made from the polymer diol B stated in example 9, MDI, ethylenediamine and diethylamine as a terminal blocking agent was polymerized by ordinary methods, thereby making polymer solution B6. Then, 97 wt % of this polymer solution B6 and 3 wt % of the other additive solution C1 prepared in example 1 were uniformly mixed, thereby making spinning solution D10.

This spinning solution D10 was dry-spun and wound at a spinning speed of 600 m/minute and a speed ratio of the godet roller and winder of 1.20, thereby producing 20 dtex/2-filament multifilament polyurethane elastic yarn (500 g spool).

The composition (wt %) of the obtained polyurethane elastic yarn was as shown in Table 1.

The fracture ductility, fracture strength, permanent set, stress relaxation, chemical resistance, alkali resistance, heat softening point and melting point of this polyurethane elastic yarn are shown in Table 2. Fracture ductility and fracture strength were both greater than those in comparative example 2 (described below). Relaxation stress and permanent set at 22° C. were lower than in comparative example 2, and permanent set at −5° C. was reduced to less than ¼ of that in comparative example 2, indicating that recoverability improved. Chemical resistance and alkali resistance were 2 or more times and 3 or more times, respectively, those in comparative example 2. Heat softening point and melting point, which are indices of heat resistance, both improved over comparative example 2.

Also, a stretch weave was produced by the same method as in example 1, and when quality of appearance was evaluated, the obtained stretch weave had an excellent quality of appearance without flaws.

Comparative Example 1

97 wt % of the polymer solution A1 prepared in example 1 and 3 wt % of the other additive solution C1 prepared in example 1 were uniformly mixed, thereby making spinning solution E1. This spinning solution E1 was dry-spun and wound at a spinning speed of 540 m/minute and a speed ratio of the godet roller and winder of 1.40, thereby producing 20 dtex/monofilament polyurethane elastic yarn.

The composition (wt %) of the obtained polyurethane elastic yarn was as shown in Table 1.

The fracture ductility, fracture strength, permanent set, stress relaxation, chemical resistance, alkali resistance, heat softening point and melting point of this polyurethane elastic yarn are shown in Table 2. Chemical resistance and alkali resistance were both worse than in examples 1 and 2. Also, a stretch weave was produced by the same method as in example 1, and when quality of appearance was evaluated, the occurrence of partial billowing caused by fatigue of the polyurethane yarn due to its various processing history was seen in 15 places per 20 m.

Comparative Example 2

97 wt % of the polymer solution A2 prepared in example 3 and 3 wt % of the other additive solution C1 prepared in example 1 were uniformly mixed, thereby making spinning solution E2.

This spinning solution E2 was dry-spun and wound at a spinning speed of 600 m/minute and a speed ratio of the godet roller and winder of 1.20, thereby producing 20 dtex/2-filament multifilament polyurethane elastic yarn (500 g spool).

The composition (wt %) of the obtained polyurethane elastic yarn was as shown in Table 1.

The fracture ductility, fracture strength, permanent set, stress relaxation, chemical resistance, alkali resistance, heat softening point and melting point of this polyurethane elastic yarn are shown in Table 2. Chemical resistance and alkali resistance were both worse than in examples 3 and 4. Also, a stretch weave was produced by the same method as in example 1, and when quality of appearance was evaluated, the occurrence of partial billowing caused by fatigue of the polyurethane yarn due to its various processing history was seen in 4 places per 20 m.

Comparative Example 3

For a polyurethane containing a polybutadiene structure in which the proportion of 1,2-bonded butadiene structure to 1,4-bonded butadiene structure was 92.4:7.6, a DMAc solution of 35 wt % of polyurethane polymer (f1) made from PBD (made by Nippon Soda Co., Ltd.) stated in patent document 1 having the structure shown in compound 1, MDI and ethylene glycol was polymerized by ordinary methods, thereby making polymer solution F1. Then, 92 wt % of the polymer solution A1 prepared in example 1, 5 wt % of the polymer solution F1 prepared here and 3 wt % of the other additive solution C1 prepared in example 1 were uniformly mixed, thereby making spinning solution E3.

This spinning solution E3 was dry-spun and wound at a spinning speed of 600 m/minute and a speed ratio of the godet roller and winder of 1.30, thereby producing 20 dtex/2-filament multifilament polyurethane elastic yarn (500 g spool).

The composition (wt %) of the obtained polyurethane elastic yarn was as shown in Table 1.

The fracture ductility, fracture strength, permanent set, stress relaxation, heat softening point, melting point and chemical resistance of this polyurethane elastic yarn are shown in Table 2. Permanent strain rate at −5° C. was lower than in comparative example 1, and chemical resistance and alkali resistance were greater than in comparative example 1, but they were worse than in examples 1, 5, 7 and the like. Also, a stretch weave was produced by the same method as in example 1, and when quality of appearance was evaluated, billowing due to fatigue, which was thought to be due to an increased permanent set of the polyurethane yarn, was seen all over, and the product was unsatisfactory.

Comparative Example 4

For a polyurethane containing a polybutadiene structure in which the proportion of 1,2-bonded butadiene structure to 1,4-bonded butadiene structure was 92.4:7.6, a DMAc solution of 35 wt % of polyurethane urea polymer (f2) made from PBD (made by Nippon Soda Co., Ltd.) stated in patent document 1, MDI and ethylenediamine was polymerized by ordinary methods, thereby making polymer solution F2. Then, 87 wt % of the polymer solution A1 prepared in example 1, 10 wt % of the polymer solution F2 prepared here and 3 wt % of the other additive solution C1 prepared in example 1 were uniformly mixed, thereby making spinning solution E4.

This spinning solution E4 was dry-spun and wound at a spinning speed of 600 m/minute and a speed ratio of the godet roller and winder of 1.30, thereby producing 20 dtex/2-filament multifilament polyurethane elastic yarn (500 g spool).

The composition (wt %) of the obtained polyurethane elastic yarn was as shown in Table 1.

The fracture ductility, fracture strength, permanent set, stress relaxation, heat softening point, melting point and chemical resistance of this polyurethane elastic yarn are shown in Table 2. Permanent strain rate at −5° C. was lower than in comparative example 2, and chemical resistance and alkali resistance were greater than in comparative example 2, but they were worse than in examples 3, 6, 8 and the like. Also, a stretch weave was produced by the same method as in example 1, and when quality of appearance was evaluated, billowing due to fatigue, which was thought to be due to an increased permanent set of the polyurethane yarn, was seen all over, and the product was unsatisfactory.

Comparative Example 5

97 wt % of the polymer solution F1 prepared in comparative example 3 and 3 wt % of the other additive solution C1 prepared in example 1 were uniformly mixed, thereby making spinning solution E5.

It was attempted to dry-spin this spinning solution E5 at a spinning speed of 450 m/minute and a speed ratio of the godet roller and winder of 1.20, but it did not result in a yarn-like form, and a polyurethane elastic yarn was not obtained.

Comparative Example 6

97 wt % of the polymer solution F2 prepared in comparative example 4 and 3 wt % of the other additive solution C1 prepared in example 1 were uniformly mixed, thereby making spinning solution E6.

It was attempted to dry-spin this spinning solution E6 at a spinning speed of 450 m/minute and a speed ratio of the godet roller and winder of 1.20, but it did not result in a yarn-like form, and a polyurethane elastic yarn was not obtained.

Furthermore, the compositions (wt %) of the polyurethane elastic yarns obtained in the above examples 1-8 and comparative examples 1-4 as well as the compositions (wt %) of the polyurethanes prepared in comparative examples 5 and 6 are compiled in Table 1. Also, the fracture ductility, fracture strength, permanent set, stress relaxation, chemical resistance, alkali resistance, heat softening point and melting point of each of the polyurethane elastic yarns obtained in the above examples 1-8 and comparative examples 1-4 are compiled in Table 2.

TABLE 1

|  | Polyurethane not containing polybutadiene structure | | Polyurethane containing polybutadiene structure | | | | |
| --- | --- | --- | --- | --- | --- | --- | --- |
|  | | | b1 Proportion of 1,2-bonded type to 1,4-bonded type | b2 Proportion of 1,2-bonded type to 1,4-bonded type | b3 Proportion of 1,2-bonded type to 1,4-bonded type | b4 Proportion of 1,2-bonded type to 1,4-bonded type | b5 Proportion of 1,2-bonded type to 1,4-bonded type |
|  | a1 | a2 | 65:35 | | 90:10 | 20:80 | 65:35 |
|  | Polyurethane polymer | Polyurethane urea polymer | Polyurethane polymer | Polyurethane urea polymer | Polyurethane polymer | Polyurethane urea polymer | Polyurethane polymer |
| Example 1 | 92 | | 5 | | | | |
| Example 2 | 77 | | | 20 | | | |
| Example 3 | | 87 | | 10 | | | |
| Example 4 | | 87 | 30 | | | | |
| Example 5 | | 97 | | | | | |
| Example 6 | | | | 97 | | | |

TABLE 1-continued

| | | | | | |
|---|---|---|---|---|---|
| Example 7 | 92 | | 5 | | |
| Example 8 | | 87 | | 10 | |
| Example 9 | | | | | 97 |
| Example 10 | | | | | |
| Comp. ex. 1 | 97 | | | | |
| Comp. ex. 2 | | 97 | | | |
| Comp. ex. 3 | 92 | | | | |
| Comp. ex. 4 | | 87 | | | |
| Comp. ex. 5 | | | | | |
| Comp. ex. 6 | | | | | |

| | Polyurethane containing polybutadiene structure | | | Other additives | | |
|---|---|---|---|---|---|---|
| | b6 | f1 | f2 | c1 | c2 | |
| | Proportion of 1,2-bonded type to 1,4-bonded type 65:35 | Proportion of 1,2-bonded type to 1,4-bonded type 92.4:7.6 | | Polyurethane produced by reaction of t-butyl-diethanol-amine and methylene-bis(4-cyclohexyl-isocyanate) | Condensation polymer of p-cresol and divinyl-benzene | Was dry spinning possible? |
| | Polyurethane urea polymer | Polyurethane polymer | Polyurethane urea polymer | | | |
| Example 1 | | | | 2 | 1 | Yes |
| Example 2 | | | | 2 | 1 | Yes |
| Example 3 | | | | 2 | 1 | Yes |
| Example 4 | | | | 2 | 1 | Yes |
| Example 5 | | | | 2 | 1 | Yes |
| Example 6 | | | | 2 | 1 | Yes |
| Example 7 | | | | 2 | 1 | Yes |
| Example 8 | | | | 2 | 1 | Yes |
| Example 9 | | | | 2 | 1 | Yes |
| Example 10 | 97 | | | 2 | 1 | Yes |
| Comp. ex. 1 | | | | 2 | 1 | Yes |
| Comp. ex. 2 | | | | 2 | 1 | Yes |
| Comp. ex. 3 | | 5 | | 2 | 1 | Yes |
| Comp. ex. 4 | | | 10 | 2 | 1 | Yes |
| Comp. ex. 5 | | 97 | | 2 | 1 | No |
| Comp. ex. 6 | | | 97 | 2 | 1 | No |

TABLE 2

| | Breaking elongation (%) | Breaking strength (cN) | Permanent set (%) 22° C. | Permanent set (%) −5° C. | Stress relaxation (%) | Chemical resistance (%) | Alkali resistance (%) | Heat softening point (° C.) | Melting point (° C.) | Quality of appearance of dyed stretch fabric |
|---|---|---|---|---|---|---|---|---|---|---|
| example1 | 425 | 23 | 22 | 24 | 34 | 71 | 75 | 181 | 229 | X |
| example2 | 416 | 25 | 18 | 19 | 34 | 80 | 91 | 190 | 231 | X |
| example3 | 513 | 43 | 17 | 22 | 26 | 75 | 90 | 215 | 268 | X |
| example4 | 514 | 39 | 14 | 22 | 27 | 85 | 90 | 210 | 278 | X |
| example5 | 410 | 23 | 22 | 22 | 33 | 87 | 92 | 185 | 234 | X |
| example6 | 505 | 40 | 15 | 15 | 26 | 88 | 95 | 212 | 265 | X |
| example7 | 420 | 23 | 23 | 40 | 34 | 55 | 61 | 180 | 229 | X |
| example8 | 510 | 38 | 17 | 38 | 26 | 69 | 68 | 213 | 268 | X |
| example9 | 414 | 23 | 22 | 22 | 34 | 75 | 90 | 184 | 230 | X |
| example10 | 510 | 40 | 17 | 21 | 26 | 81 | 91 | 215 | 268 | X |
| comp. ex. 1 | 400 | 21 | 25 | 96 | 35 | 35 | 35 | 180 | 225 | Y |
| comp. ex. 2 | 460 | 25 | 20 | 90 | 28 | 29 | 30 | 205 | 265 | Y |
| comp. ex. 3 | 420 | 23 | 26 | 78 | 34 | 45 | 42 | 181 | 228 | Z |
| comp. ex. 4 | 510 | 38 | 19 | 74 | 26 | 55 | 44 | 210 | 267 | Z |

INDUSTRIAL USABILITY

The polyurethane elastic yarn of the current invention has high strength and ductility, high durability, high heat resistance and good low-temperature characteristics. Therefore, clothing and the like that uses this elastic yarn has excellent desorption characteristics, fit, feel, ability to be dyed, fade resistance and quality of appearance, and the environment in which it is used is not limited.

Also, because the polyurethane elastic yarn according to the present invention has these excellent characteristics, it can be used alone or in combination with various fibers to obtain an excellent stretch fabric, and it is suitable for knitting, weaving and braiding. Specific applications in which it can be used include various textile products such as socks, stockings, circular knits, tricot, swimwear, ski pants, work clothes, golf pants, wet suits, brassieres, girdles and gloves, elastic materials, waterproof elastic materials of sanitary products such as paper diapers, elastic materials for waterproof materials, imitation food, artificial flowers, electrical insulation materials, wiping cloth, copy cleaners, gaskets and the like.

The invention claimed is:

1. A polyurethane elastic yarn made from polyurethane which has polymer diol and diisocyanate as starting substances, wherein said polymer diol comprises polytetramethylene ether glycol (PTMG) or modified PTMG, and said polyurethane comprises a blend of (i) polyurethane A containing a polybutadiene structure in which the proportion of 1,2-bonded butadiene structure to 1,4-bonded butadiene structure in the molecule is in the range from 70:30 to 40:60; and (ii) polyurethane B made from a polymer diol other than said polybutadiene diol or polyisoprenediol and diisocyanate, wherein said polyurethane elastic yarn exhibits increased chemical resistance as measured by strength as compared to polyurethane yarns outside the range from 70:30 to 40:60 of the polybutadiene structure.

2. The polyurethane elastic yarn according to claim 1, wherein said polyurethane A is polyurethane obtained by copolymerization of a polydiene diol selected from the group consisting of polybutadiene diol, polyisoprene diol, and mixtures thereof, a polymer diol other than said polydiene diol and diisocyanate.

3. A method of producing a polyurethane elastic yarn by spinning a spinning starting solution containing polyurethane having polymer diol and diisocyanate as starting substances, wherein said polymer diol comprises polytetramethylene ether glycol (PTMG) or modified PTMG, and said polyurethane comprises a blend of (i) polyurethane A containing a polybutadiene structure in which the proportion of 1,2-bonded butadiene structure to 1,4-bonded butadiene structure in the molecule is in the range from 70:30 to 40:60 and prepared from a polybutadiene dial and diisocyanate; and (ii) polyurethane B made from a polymer diol other than said polybutadiene diol or polyisoprenediol and diisocyanate, wherein said polyurethane elastic yarn exhibits increased chemical resistance as measured by strength as compared to polyurethane yarns outside the range from 70:30 to 40:60 of the polybutadiene structure.

4. The method of producing a polyurethane elastic yarn according to claim 3, wherein the spinning method is dry spinning.

5. A polyurethane elastic yarn made from polyurethane which has polymer diol and diisocyanate as starting substances, wherein said polymer diol comprises polytetramethylene ether glycol (PTMG) or modified PTMG, and said polyurethane comprises a blend of (i) polyurethane A containing a polybutadiene structure in which the proportion of 1,2-bonded butadiene structure to 1,4-bonded butadiene structure in the molecule is in the range from 70:30 to 40:60; and (ii) polyurethane B made from a polyether-based diol and a diisocyanate, wherein said polyurethane elastic yarn exhibits increased chemical resistance as measured by strength as compared to polyurethane yarns outside the range from 70:30 to 40:60 of the polybutadiene structure.

6. The polyurethane elastic yarn of claim 5, wherein said diisocyanate is selected from the group consisting of diphenylmethane diisocyanate, tolylene diisocyanate, 1,4 diisocyanate benzene, xylylene diisocyanates, 2,6-naphthalene diisocyanates, methylenebis(cyclohexyl isocyanate), isophorone diisocyanate, methylcyclohexane 2,4-diisocyanate, methylcyclohexane 2,6-diisocyanate, cyclohexane 1,4-diisocyanate, hexahydro xylylene diisocyanate, hexahydro tolylene diisocyanate and octahydro 1,5-naphthalene diisocyanate.

* * * * *